United States Patent [19]

Scheit et al.

[11] Patent Number: 5,132,910
[45] Date of Patent: Jul. 21, 1992

[54] METHOD AND A DEVICE FOR ALIGNING A SPACE VEHICLE, PARTICULARLY A GEOSTATIONARY SATELLITE, IN A REFERENCE DIRECTION

[75] Inventors: Arnold Scheit, München; Horst-Dieter Fischer, Unterhaching, both of Fed. Rep. of Germany

[73] Assignee: Messerschmitt-Bolkow-Blohm GmbH, Fed. Rep. of Germany

[21] Appl. No.: 550,870

[22] Filed: Jul. 11, 1990

[30] Foreign Application Priority Data

Jul. 11, 1989 [DE] Fed. Rep. of Germany ....... 3922761

[51] Int. Cl.$^5$ .......................... G06F 15/50; B64G 1/44
[52] U.S. Cl. ..................................... 364/459; 364/434; 244/164
[58] Field of Search .................. 364/459, 455, 434; 244/164; 356/141, 143

[56] References Cited

U.S. PATENT DOCUMENTS

| | | | |
|---|---|---|---|
| 4,325,124 | 4/1982 | Renner | 364/459 |
| 4,489,383 | 12/1984 | Schmidt, Jr. | 364/434 |
| 4,521,855 | 6/1985 | Lehner et al. | 364/434 |
| 4,827,421 | 5/1989 | Dondl | 364/459 |
| 4,827,422 | 5/1989 | Savoca | 364/459 |

Primary Examiner—Thomas G. Black
Attorney, Agent, or Firm—Evenson, Wands, Edwards, Lenahan & McKeown

[57] ABSTRACT

A method and arrangement for aligning a space vehicle with respect to a reference object is disclosed. A measuring direction is obtained by determining the angular orientation direction of the space vehicle with respect to the reference object and subsequently the space vehicle is aligned by means of actuators such that the measuring direction corresponds to a reference direction on the space vehicle. The actuators are driven by control signals which are derived from the measuring direction to cause control torques on the space vehicle. The orientation of the space vehicle and reference object is determined only with respect to a single measuring direction along a main axis of a direction sensor. The following steps are taken if the measuring direction does not correspond to the reference direction on the space vehicle:

a) the space vehicle is rotated around the reference direction on the space vehicle,
b) controlling a fault component of the direction of the reference object situated in the measuring direction by locking on a first control torque perpendicularly with respect to the reference direction on the space vehicle, and
c) controlling the unmeasurable component of the direction of the reference object situated perpendicularly with respect to the measuring direction by locking on a second control torque perpendicularly with respect to the reference direction and perpendicularly with respect to the first steering moment.

9 Claims, 6 Drawing Sheets

METHOD AND A DEVICE FOR ALIGNING A SPACE VEHICLE, PARTICULARLY A GEOSTATIONARY SATELLITE, IN A REFERENCE DIRECTION

BACKGROUND AND SUMMARY OF THE INVENTION

The invention relates to a method and a device for aligning a space vehicle, particularly a geostationary satellite, in a reference direction.

Space vehicles, such as communication satellites, must take up a defined alignment with respect to the earth and/or the sun in certain operating stages. For this purpose, the satellite must be aligned with respect to the sun by means of a specific direction set in the satellite system of coordinates, the so-called reference direction. For this reason, two generally orthogonal measurements have been made up to now in the case of geostationary satellites, by means of which the momentary direction of the sun is determined. The deviation of this momentary direction of the sun from the reference direction is then used for aligning the satellite by means of a control system. In the control system, control signals are computed from the measured data and other characteristics of the satellite and of the sensors and are converted into control signals which are then supplied to the actuator elements of the satellite.

For the previous method for aligning the satellite with respect to the sun, at least two sensors have always been required, an additional sensor being present as a result of redundancy requirements. In addition, the mentioned earth acquisition can be carried out by means of the conventional method only when certain marginal geometric conditions exist, specifically when the sun, the satellite and the earth take up a defined constellation with respect to one another. If, for example, the earth, as a result of disturbances disappears from the catch area of the satellite and its sensors, so that the so-called earth reference is lost for the satellite, considerable waiting periods must sometimes be accepted until the mentioned defined constellation is reached and an earth acquisition becomes possible.

It is an object of the invention to provide a method and a device of the above-mentioned type which permit an alignment of the satellite in the direction of a reference object, particularly the sun, by means of lower technical expenditures and a smaller number of measurements, although a simple control law is made available which is not inferior to the known control law.

According to the invention this object is achieved by providing a device and method for aligning a space vehicle with respect to a reference object, including obtaining a measuring direction by determining the angular orientation direction of the space vehicle with respect to the reference object and subsequently aligning the space vehicle by means of actuators in such a manner that the measuring direction corresponds to a reference direction on the space vehicle, said actuators being acted upon by control signals which are derived from the measuring direction to control torques on the space vehicle, wherein the orientation of space vehicle and reference object is determined only with respect to a single measuring direction along a main axis of a direction sensor, and wherein the following steps are taken if the measuring direction does not correspond to the reference direction on the space vehicle:

a) the space vehicle is rotated around the reference direction on the space vehicle, b) a fault component of the direction of the reference object situated in the measuring direction is controlled by locking on a first control torque perpendicularly with respect to the measuring direction and perpendicularly with respect to the reference direction on the space vehicle, c) the unmeasurable component of the direction of the reference object situated perpendicularly with respect to the measuring direction is controlled by locking on a second control torque perpendicularly with respect to the reference direction and perpendicularly with respect to the first steering moment.

According to certain preferred embodiments, the first control torque is represented as a vector in such a manner that $$a_2 = \tilde{S}_R e_M (N_{sy} - N_{by}) \text{ or} \qquad (5)$$

$$a_2 = \bar{O} e_M (N_{sy} - N_{by})$$

wherein $e_M$ is the vector of the measuring direction $\tilde{S}_R$ is the cross product of the vector of the reference direction with the vector of the measuring direction, $N_{sy}$ is the component of the measured direction of the sun $(S_b)$ in the measuring direction, $N_{by}$ is a preset basic value of this component, and O is the optical axis of a sensor determining the direction of the sun.

According to certain preferred embodiments, the second control torque is represented as a vector in such a manner that $$a_3 = \tilde{S}_R (\tilde{S}_R e_m)(N_{sy} - N_{by}) \text{ or} \qquad (7)$$

$$a_3 = \tilde{S}_R \bar{O} e_M (N_{sy} - N_{by}) \text{ or } a_3 = (-e_M)(N_{sy} - N_{by})$$

wherein $e_M$ is the vector of the measuring direction, $\tilde{S}_R$ is the cross product of the vector of the reference direction with the vector of the measuring direction, $N_{sy}$ is the component of the measured direction of the sun $(S_b)$ in the measuring direction, $N_{by}$ is a preset basic value of this component, and O is the optical axis of a sensor determining the direction of the sun.

According to certain preferred embodiments, the following control law is used:

$$u = -K_D(w - cS_R) + K_p(\tilde{S}_R + S_R S_R^T - I)e_M L(-N_{sy} - N_{by}) \qquad (8)$$

wherein u are the input signals for the actuators, $K_D$ are the control parameters for the rotational speeds around the space vehicle axes, $K_p$ are the control parameters for the position of the space vehicle, w are the rotational speeds of the space vehicle around are space vehicle axes, c is the value for the rotating rate of the space vehicle, $S_R$ is the vector of the reference direction, $\tilde{S}_R$ is the cross-product of the reference vector $S_R$ with the vector of the measuring direction $e_M$, $S_R^T$ is the transposed vector of the reference direction, I is the unity matrix, L is a limiter $N_{sy}$ is the measured component of the direction $S_b$ of the sun in the measuring direction, and $N_{by}$ is a preset basic value for this component.

In a preferred embodiment of the apparatus according to the present invention, an arrangement is provided:

wherein a sun sensor is provided, the output signal of which, after a zero point correction, is supplied to a limiter, wherein, in a first branch, a first multiplier is provided for calculating the rotating direction of a control vector ($a_2$) from the measuring direction ($e_M$) and a reference direction (O or SR), wherein, in a second branch, another multiplier is provided for calculating the rotating direction of another control vector also from the measuring direction ($e_M$) and a reference direction ($S_R$ or O), wherein the rotating direction vectors are each multiplied with the output signal of the limiter and are subsequently added to one another, wherein the sum signal is supplied to a multiplier for multiplication with a control parameter ($K_p$), wherein, in a third branch, a multiplier is provided for calculating a rotational speed vector ($w_b$) of the space vehicle around three axes on the space vehicle from a reference direction ($S_R$) in a constant (c), wherein three multipliers are provided in which the sum signal combined from the two control vectors ($a_2$, $a_3$), the rotational speed vector ($w_b$) and the rotational speeds (w) of the space vehicle are multiplied with control parameters ($K_p$, $K_D$), and wherein the output quantities of these multipliers are supplied to an adding device, the output signal of which is the control signal.

In the case of the suggested method of the invention, only a single measuring signal is required with respect to a direction; i.e., also only a single sensor by means of which the direction of the reference object, in the following generally called the sun, is determined with respect to the measuring direction of the sensor, i.e., its main axis. According to this control concept, when there is a deviation from the alignment with the sun, the space vehicle is first rotated around an axis which coincides with the reference direction on the space vehicle. The actuators are driven by control signals in such a manner that the component of the momentary direction of the sun is controlled in the measuring direction. The second component of the momentary direction of the sun which is perpendicular with respect to the measuring direction and which cannot be measured, subsequently is also controlled in that control signals are supplied to the actuators in such a manner that the control torques act upon the space vehicle perpendicularly with respect to the reference direction and perpendicularly with respect to the first control torque. For this maneuver, the momentary direction of the sun is made to conform with the reference direction.

The two control torques may either be geared to the reference direction on the space vehicle or, particularly if the sensors, such as sun sensors, have fields of view with a directional angle of more than 90°, may use the optical axis of this sensor as a reference. As a result, convergency difficulties are avoided for certain constellations for the direction of the sun and the reference direction. This has the additional advantage that the vectors occurring in the control law are constant for the individual sensors; i.e., do not depend on the reference direction which means that the calculation of the control law is simplified.

By means of a method and a device according to the invention, at least two sun sensors may be saved, for example, in the case of communication satellites, specifically the generally primary sensor and the redundant sensor, by means of which, according to the conventional method, the second direction components of the sun vector pointing to the sun are measured corresponding to the direction of the sun and which are required only for maneuvers for the earth acquisition.

In addition, according to the invention, the waiting period for the earth acquisition can be reduced after the loss of the earth reference. Since only one sensor is required, such an earth acquisition, after the loss of the earth reference, is also possible by means of additional uniaxial sun sensors existing for other maneuvers. Thus, for a new earth acquisition, there has to be no waiting for the constellation between the sun, the space vehicle and the earth which is defined in the known methods.

Although the method according to the invention can be carried out with considerably reduced technical measuring expenditures, the time periods which are required for an alignment of the space vehicle are no longer than previously.

Other objects, advantages and novel features of the present invention will become apparent from the following detailed description of the invention when considered in conjunction with the accompanying drawings.

DETAILED DESCRIPTION OF THE INVENTION

Figure 1:
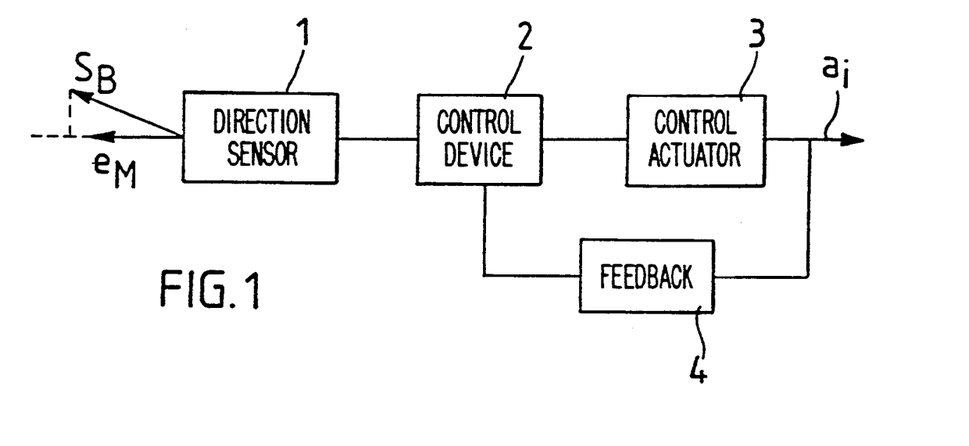
FIG. 1 is a schematic block diagram of the most important components of a satellite for facilitating its alignment with the sun according to a preferred embodiment of the invention.

FIG. 1 shows a direction sensor 1, the measuring direction or main axis of which has the symbol $e_M$. By means of this direction sensor 1, the component of the momentary direction of the sun $S_B$ is measured with respect to the measuring direction $e_M$. These measuring values are transmitted to a control device 2; according to a control law, are converted there into control signals; and finally are transformed to torque commands which are supplied to the actuators 3 of the satellite. The result are directed control torques which, in the following, are generally called vectors $a_i$.

Figure 2:
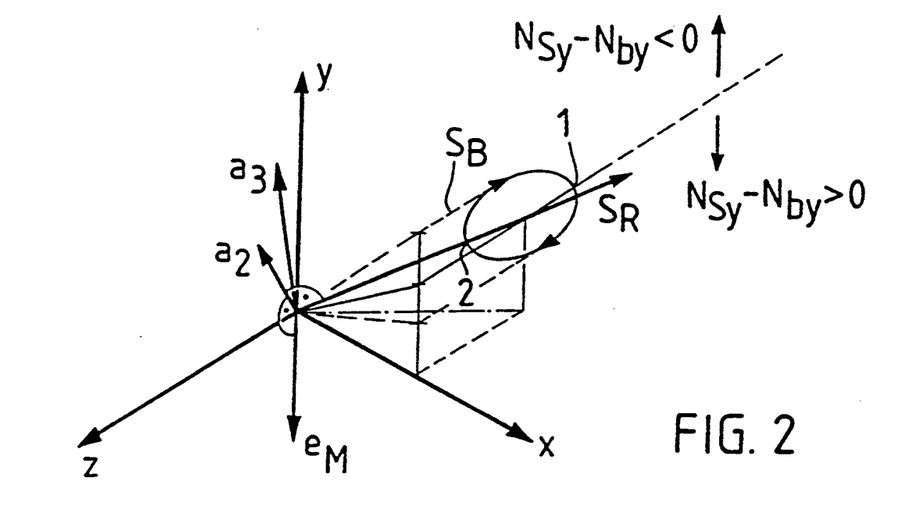
FIG. 2 is a system of coordinates for explaining the vectors used in the method according to the invention.

FIG. 2 shows a system of coordinates X-Y-Z on the satellite. In this diagram, the measuring direction $e_M$, the reference direction $S_R$ on the satellite with respect to the sun, and the momentary direction of the sun $S_B$ are also shown as vectors. The sensor 1 measures only the component of the momentary direction of the sun $S_B$ with respect to the measuring direction $e_M$. The pertaining sensor signal $N_{sy}$ is determined by the generally nonlinear output characteristic f of the direction sensor and, written in the manner of vectors, can be indicated by $$N_{sy} = f(e_M^T S_B) \tag{1}$$

$e_M^T$ being the transposed vector $e_M$.

The measuring signal $N_{sy}$ becomes positive when the momentary direction of the sun $S_B$ has a positive component in the measuring direction. A preset measuring value or basic value $N_{by}$ corresponds to the reference direction $S_R$ and may be indicated as $$N_{by} = f(e_M^T S_R) \tag{2}$$

For a correct alignment with the sun, the measured component $N_{sy}$ of the momentary direction of the sun must therefore correspond to the basic value $N_{by}$.

If this is not so, an alignment is carried out according to a control law which comprises three parts:

Part 1

When a faulty alignment is determined, the satellite is set in rotation around the reference direction $S_R$ on the satellite. The control device transmits control signals to the actuators by means of which a rotational rate vector $W_b$ of the satellite is achieved around its three axes X, Y, Z on the satellite. This rotational rate vector can therefore be expressed by $$w_b c S_R \tag{3}$$

In this equation, c is larger than zero and a measurement for the rate of rotation. If only this rotational rate vector is locked on to the satellite as the control signal, the vector $S_B$ pointing to the sun describes the cone which in FIG. 2 is indicated by an orbit around the reference direction $S_R$.

Part 2

The measured component of the momentary vector $S_B$ of the direction of the sun is controlled until the difference between the measured component $N_{sy}$ and the basic value $N_{by}$, i.e.

$$Delta\ N = N_{sy} - N_{by} \tag{4}$$

is approximately constant. This takes place by the locking-on of a control vector which in Figure 2 has the symbol $a_2$ $$a_2 \tilde{S}_R e_M (N_{sy} - N_{by}) \text{ or} \tag{5}$$

$$a_2 = \tilde{S}_R e_M L (N_{sy} - N_{by}),$$

wherein L represents a limiting value.

$\tilde{S}_R$ is a cross product matrix, specifically of the vectors $$\tilde{S}_R = \begin{pmatrix} 0 & -S_{RZ} & S_{RY} \\ S_{RZ} & 0 & -S_{RX} \\ -S_{RY} & S_{RX} & 0 \end{pmatrix} \tag{6}$$

so that $\tilde{S}_R e_M$ corresponds to the cross product of $S_R$ and $e_M$.

Part 3

By means of the direction sensor, only the component of the momentary sun vector $S_B$ can be measured, but not the component which is perpendicular to it. The above-described steps ensure only that the satellite rotates around directions for which the mentioned difference between the component $N_{sy}$ and the basic value $N_{by}$ is constant, but not that the alignment of the satellite is in fact adjusted to the reference direction $S_R$. This component of the vector $S_B$, which is perpendicular to the measuring direction $e_M$, is now controlled by the fact that another vector $a_3$ is locked on, specifically $$a_3 = \tilde{S}_R (\tilde{S}_R e_M)(N_{sy} - N_{by}) \tag{7}$$

$$= (S_R S_R^T - I) e_M (N_{sy} - N_{by})$$

$S_R^T$ is the transposed vector of $S_R$; I is the unit matrix. Here also, part $(N_{sy} - N_{by})$ may be limited by a factor L.

This vector results in a control torque or transverse torque with respect to the satellite which acts perpendicularly with respect to the reference direction and perpendicularly with respect to the first vector $a_2$.

If, after this control step, the measured component $N_{sy}$ of the sun vector $S_B$ corresponds to the basic value $N_{by}$, the control operation is completed and the satellite is brought into the correct alignment. The above-mentioned difference $Delta\ N = N_{sy} - N_{by}$ will now be zero.

The following control law can be established from the described three parts for the control signals u to be communicated to the actuators:

$$u = -K_D(w - cS_R) + K_p[I + \tilde{S}_R] \tilde{S}_R e_M L \{N_{sy} - N_{by}\} \tag{8}$$

$$= -K_D(w - cS_R) + K_p[\tilde{S}_R + S_R S_R^T - I] e_M L \{N_{sy} = N_{by}\}$$

wherein L is a limiter.

The control parameters $K_D$ for the control amplification with respect to the rotational speed w of the satellite around the three coordinate axes and $K_p$ for the control amplifications with respect to the position of the satellite are written as diagonal matrices; i.e., these control parameters for the individual coordinate directions are provided by the diagonal values of matrices $K_D$ or $K_p$. For the selection of the control device parameters, it should be observed that approximately the following applies $$\frac{K_{pi} \cdot t_{ci}}{J_{si}} = \text{const. and } \frac{K_{Di}}{K_{pi}} = \text{const with } i = x, y, z \tag{9}$$

so that the individual parts in the control law according to equation (8) become vectorially effective, i.e., uniformly in all axes.

In this equation, $t_{ci}$ are the control torques, such as the control torques which are applied by the nozzles of the satellite, and $J_{si}$ is the mass moment of inertia, in each case, around the axis i corresponding to x, y, z.

Figure 3:
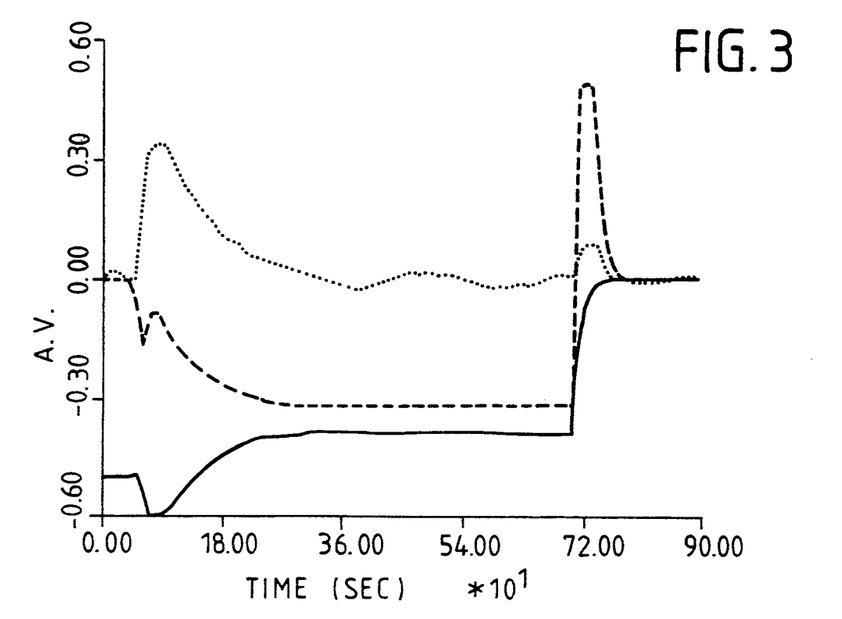
FIGS. 3 to 5 are time dependency diagrams of the rotational speeds of the components of the sun vector and of the earth vector, in each case, relative to a system of coordinates on the satellite, during the aligning operation.
Figure 4:
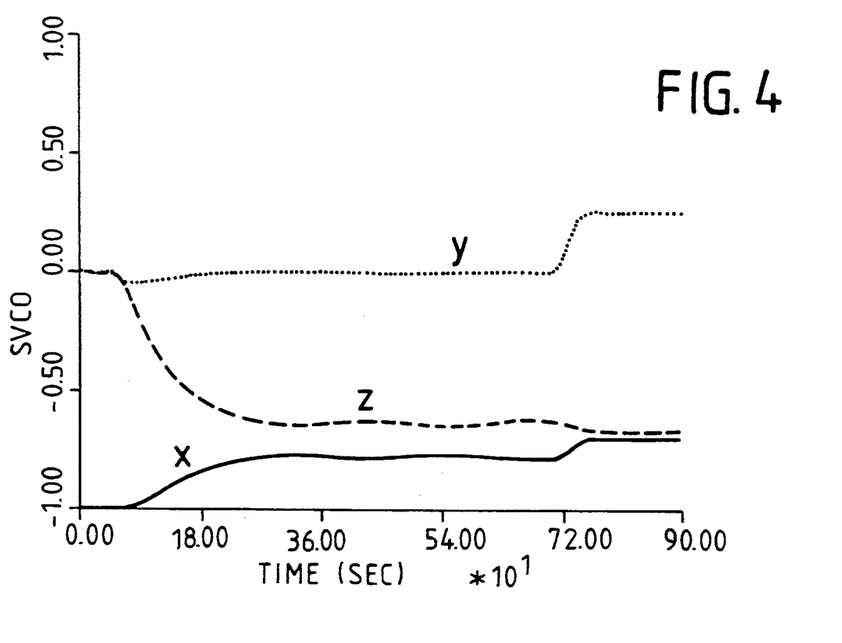
Figure 5:
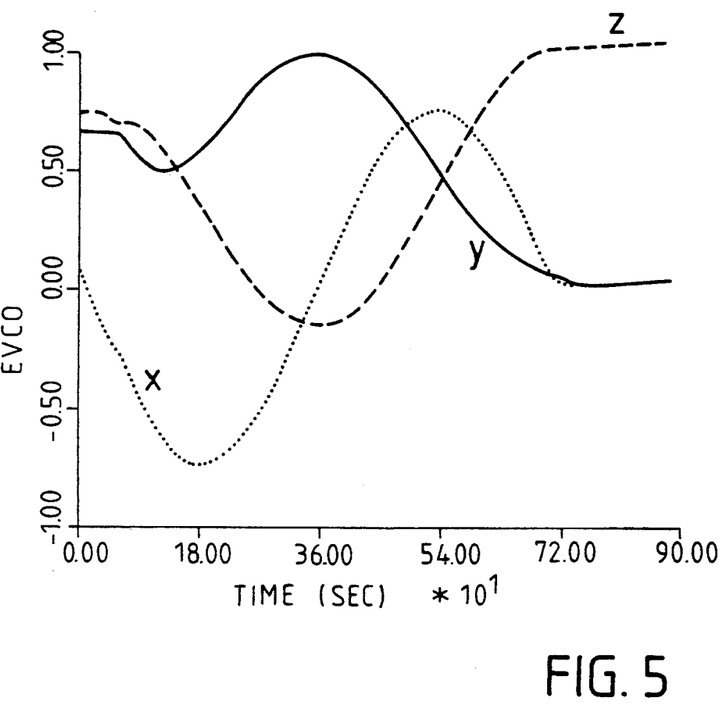
Figure 6:
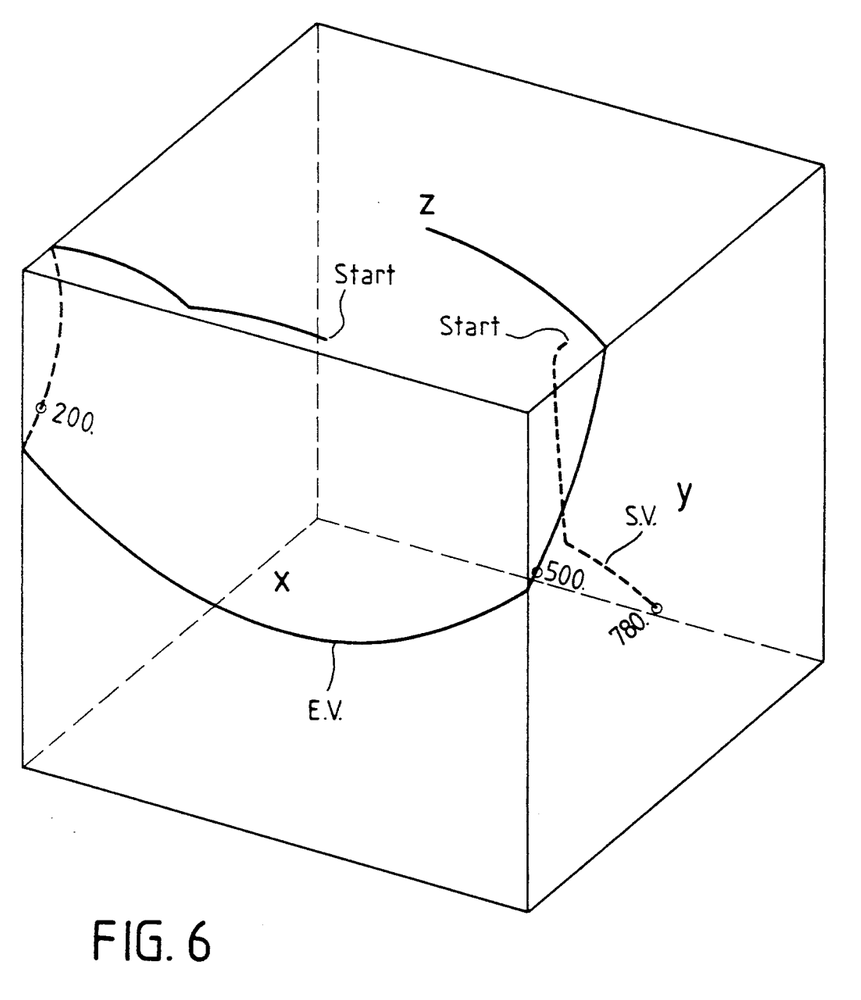
Figure 6 is the trace of the sun vector and of the earth vector on the satellite surface shown schematically as a cube, during the aligning operation.
Figure 7:
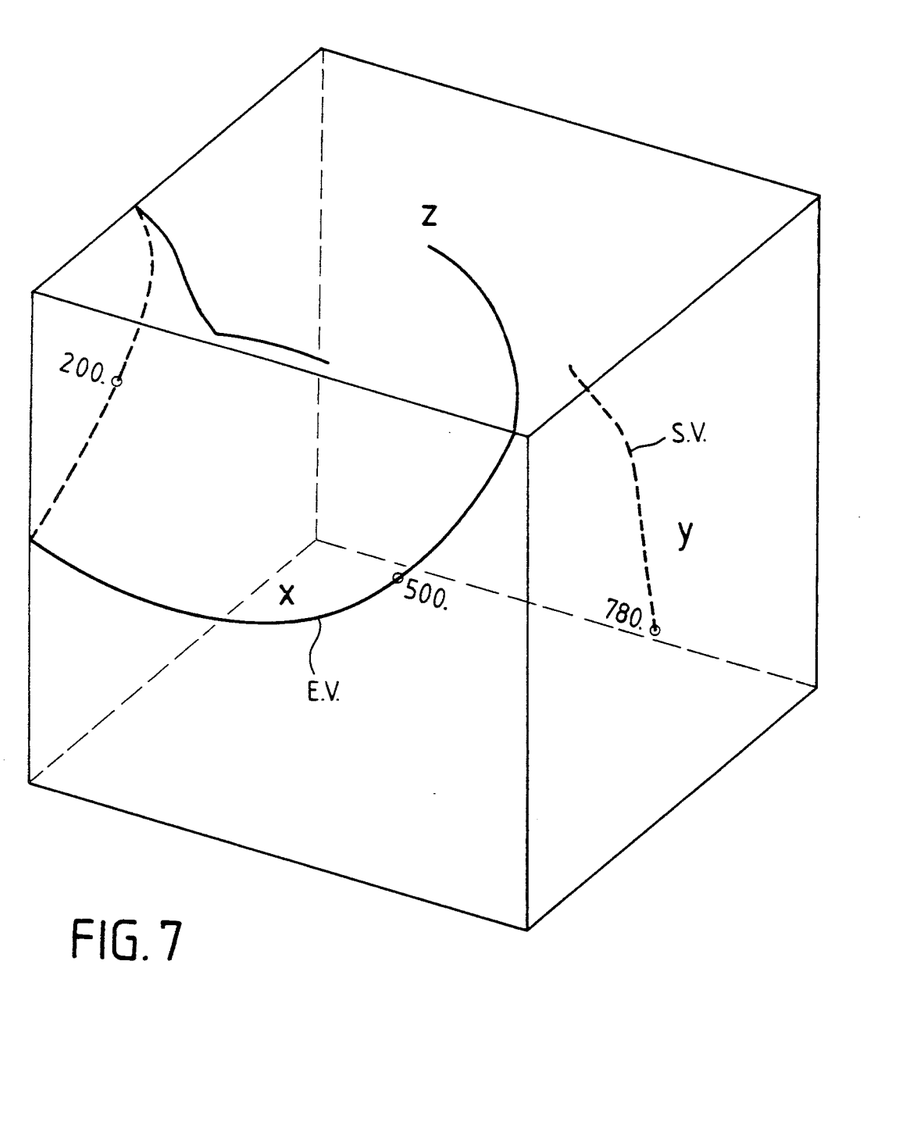
FIG. 7 is a representation corresponding to FIG. 6 in the case of a known aligning operation.

The method was verified by means of simulations. The results of the simulations are shown in FIGS. 3 to 6, specifically in connection with an earth acquisition of a geostationary satellite. FIG. 3 illustrates the rotational rate of the satellite around the three coordinate axes X, Y, Z above the time; FIG. 4 shows the trace of the components of the sun vector $S_B$ also in the three coordinate directions; and FIG. 5 shows the trace of the components of the vector directed to the earth. In addition, FIG. 6 indicates the trace of the sun vector S.V. and of the earth vector E.V. on the satellite surface during the control operation. The whole control operation for the sun alignment of the satellite is completed within approximately 12 to 13 minutes. The known methods achieve an exact alignment approximately within the same time period. For purposes of comparison, FIG. 7 also shows the trace of the sun and earth vector on the satellite surface during the known control operation. It is shown that the traces of these vectors develop similarly to those in the method according to the invention. The respective directions of the vectors at given times (in seconds) are indicated along the traces next to small circles.

Figure 8:
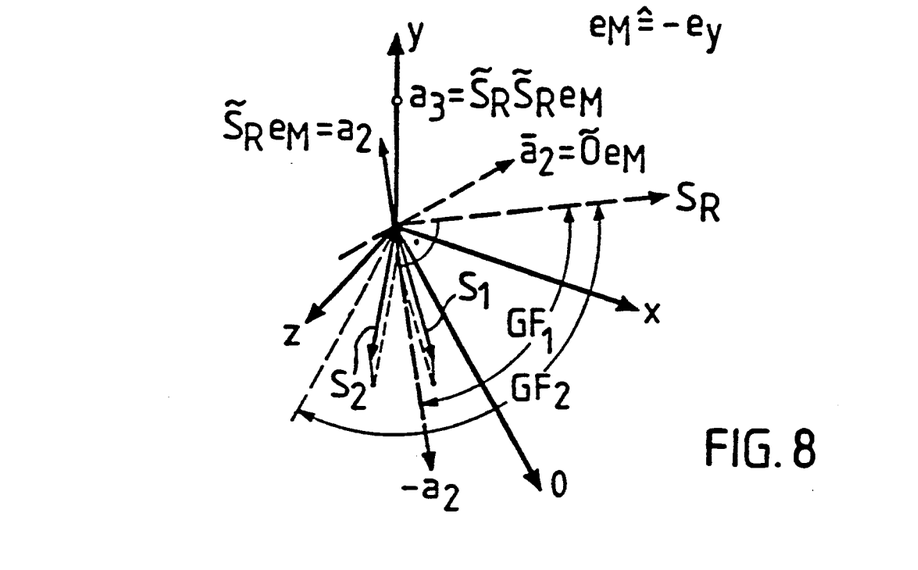
FIG. 8 is a system of coordinates for explaining a second embodiment of the invention.

FIG. 8 illustrates a system of coordinates for a variant of the above-explained control law, specifically for sun sensors with a field of view GF which is larger than 90°. The above-mentioned control torques $a_2$ and $a_3$, which refer to the reference direction, may lead to convergency difficulties in this case. While the initial sun position S1, which is situated in a first field of view $GF_1$ with an angle of view of <90°, is controlled, for sun position S2 in the field of view $GF_2$ with an angle of view of >90°, the projection in the direction of the Y-axis, i.e., of the negative vector direction $(-e_M)$ becomes progressively larger. This disadvantage can be avoided if the optical axis O of the sun sensor, which in FIG. 8 is shown as the median line of the field of view $GF_2$, is used in the control law. The direction of the optical axis generally can be defined as follows:

for biaxial sensors, as the direction for which both measuring signals are zero;

for uniaxial sensors, as the direction of the intersection line of the planes on which the $e_M$ is disposed perpendicularly with the plane which divides the field of view symmetrically.

The modified parts of the control law are therefore as follows:

$$a_2 = \overline{O}e_M L(N_{sy} - N_{by}) \quad (10)$$

and $$a_3 = \overline{S}_R \overline{O} e_M L(N_{sy} N_{by}) \quad (11a)$$

or $$a_3 = S_R O e_M L(N_{sy} - N_{by}) \quad (11b)$$

The indication of the control torque $a_3$ according to equation (11b) is possible as an alternative to the indication of equation (11a), since the projection of the vector according to equation (11a) in the direction of the measuring direction $e_M$ is unambiguous with respect to its signs. This is the result of:

$$e_M^T \overline{S}_R \overline{O} e_M = e_M^T (OS_R^T - S_R^T OI) e_M = -S_R^T O \leq O \quad (12)$$

and of the fact that after the definition of the optical axis $$e_M^T O = O \text{ and}$$
$$S_R^T O \geq O$$

since commercially available sensors only have fields of view with angles of view < than 180°.

The control law parts according to equations (10) and (11b), in comparison to the above-mentioned equations (5) and (7), have the advantage that the occurring vectors are constant for each sensor; i.e., do not depend on the reference direction $S_R$ which results in a simplification with respect to the calculation of the control law.

Figure 9:
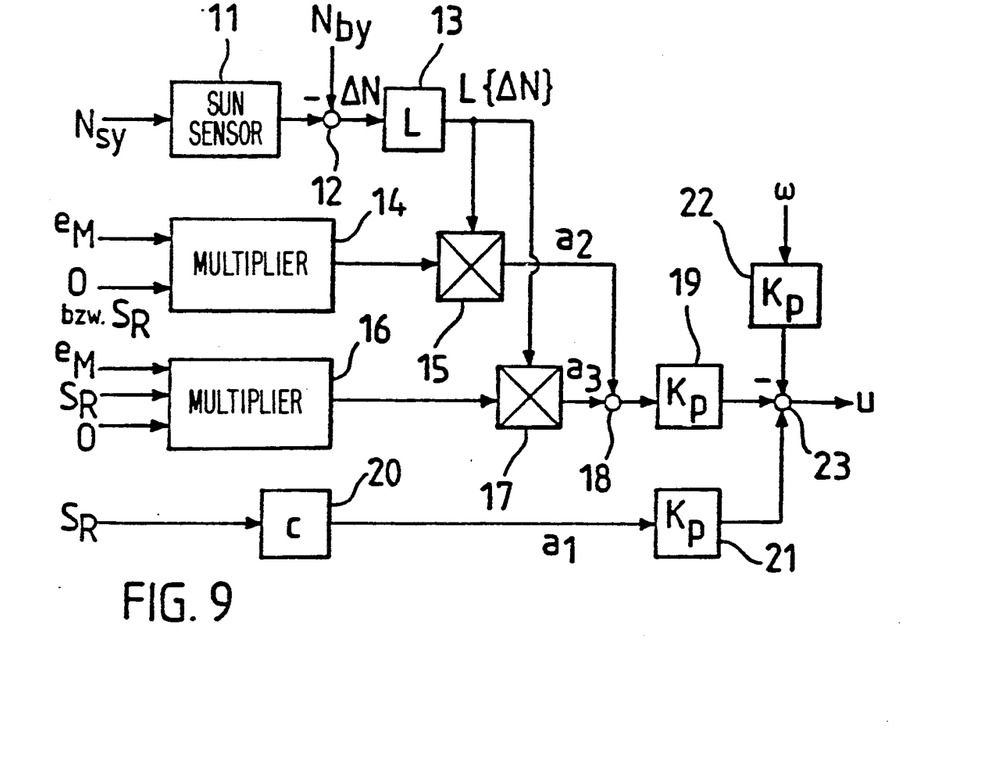
FIG. 9 is a block diagram of a device according to the invention.

FIG. 9 shows a block diagram for a device for controlling a satellite according to the described methods The sensor signal $N_{sy}$ of a sun sensor 11, in a summing junction 12, is subtracted from the basic value $N_{by}$, resulting in the above-mentioned difference Delta $N (= N_{sy} - N_{by})$. In a limiter 13, this difference is limited to a limit value L.

In a second branch, the rotating direction of the control vector $a_2$ is calculated in a multiplier 14, in that the vector $e_M$ of the measuring direction and, in the case of the first embodiment, the reference direction $S_R$ or, in the case of the second embodiment, the direction of the optical axis is supplied to this multiplier and the matrix product is formed therefrom. After a multiplication in a second multiplier 15, the product is formed from the output signal of the first multiplier and the limited angle signal so that the output signal of this second multiplier results in the steering vector $a_2$.

In a third branch, the rotating direction of the control vector $a_3$ is calculated in a third multiplier 16 according to the above-mentioned formulas, also from the input quantities $e_M$ and $S_R$ for the first embodiment, or the optical axis O for the second embodiment.

In a fourth multiplier 17, the output signal is multiplied by the limited angle signal so that the output signal of this multiplier 17 represents the control vector $a_3$. In an adding device 18, which follows, the two control vectors $a_2$ and $a_3$ are added, and the sum is supplied to a fifth multiplier 19 in which it is multiplied with the control parameter $K_p$.

In a fourth branch, the rotational rate vector $w_b$ is calculated by the multiplication of reference direction $S_R$ on the satellite with a constant c in a sixth multiplier 20. The output signal of this multiplier 20 is multiplied with the control parameter $K_D$ in a seventh multiplier 21.

In another multiplier 22, vector w is also multiplied with the control parameter $K_D$.

In an adding device 23, the output signals of the multipliers 19, 21 and 22 are combined with one another with the correct preceding signs, in which case the output signals of multipliers 19 and 21 are calculated in a positive manner and the output signal of multiplier 22 is calculated in a negative manner. The resulting signal will then be the control vector u which is to be communicated to the control elements.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A method for aligning a space vehicle with respect to a reference object, including obtaining a measuring direction by determining the angular orientation direction of the space vehicle with respect to the reference object and subsequently aligning the space vehicle by means of actuators in such a manner that the measuring direction corresponds to a reference direction on the space vehicle, said actuators being driven by control signals which are derived from the measuring direction to cause control torques on the space vehicle, wherein the orientation of the space vehicle and reference object is determined only with respect to a single measuring direction along a main axis of a direction sensor, and wherein the following steps are taken if the measuring direction does not correspond to the reference direction on the space vehicle:

a) the space vehicle is rotated around the reference direction on the space vehicle,
b) controlling a fault component of the direction of the reference object situated in the measuring direction by locking on a first control torque perpendicularly with respect tot he reference direction on the space vehicle, and
c) controlling the unmeasurable component of the direction of the reference object situated perpendicularly with respect to the reference direction on by locking on a second control torque perpendicularly with respect to the reference direction and perpendicularly with respect to the first steering moment.

2. A method according to claim 1, wherein the reference object is the sun and the space vehicle is a geostationary satellite.

3. A method according to claim 2, wherein the first control torque can be represented as a vector in such a manner that $$a_2 = \widetilde{S}_R e_M (N_{sy} - N_{by}) \text{ or}$$

$$a_2 = \bar{O} e_M (N_{sy} - N_{by}) \tag{5}$$

wherein $e_M$ is the vector of the measuring direction, $S_R$ is the cross product of the vector of the reference direction with the vector of the measuring direction, $N_{sy}$ is the component of the measured direction of the sun ($S_b$) in the measuring direction, $N_{by}$ is a preset basic value of this component, and O is the optical axis of a sensor determining the direction of the sun.

4. A method according to claim 3, wherein the second control torque is represented as a vector in such a manner that $$a_3 = \widetilde{S}_R (\widetilde{S}_R e_M)(N_{sy} - N_{by}) \text{ or} \tag{7}$$

$$a_3 = \widetilde{S}_R \bar{O} e_M (N_{sy} N_{by}) \text{ or } a_3 = (-e_M)(N_{sy} - N_{by})$$

wherein $e_M$ is the vector of the measuring direction, $S_R$ is the cross product of the vector of the reference direction with the vector of the measuring direction, $N_{sy}$ is the component of the measured direction of the sun ($S_b$) in the measuring direction, $N_{by}$ is a preset basic value of this component, and O is the optical axis of a sensor determining the direction of the sun.

5. A method according to claim 4, wherein, for the steps for aligning the space vehicle, the following control law is used:

$$u = -K_D(w - c\, S_R) + K_p(\widetilde{S}_R + S_R S_R^T - I)\, e_M L \tag{8}$$
$$(N_{sy} - N_{by})$$

wherein u are the input signals for the actuators, $K_D$ are the control parameters for the rotational rate around the space vehicle axes, $K_P$ are the control parameters for the position of the space vehicle, w are the rotational rates of the space vehicle around the space vehicle axes, c is the value for the rotating rate of the space vehicle, $S_R$ is the vector of the reference direction, $\widetilde{S}_R$ is the cross-product of the reference vector $S_R$ with the vector of the measuring direction $e_M$, $S_R^T$ is the transposed vector of the reference direction, I is the unity matrix, L is a limiting value, $N_{sy}$ is the measured component of the direction $S_b$ of the sun in the measuring direction, and $N_{by}$ is a preset basic value for this component.

6. A method according to claim 2, wherein the second control torque is represented as a vector in such a manner $$a_3 = \widetilde{S}_R (\widetilde{S}_R e_M)(N_{sy} - N_{by}) \text{ or}$$

$$a_3 = \widetilde{S}_R \bar{O} e_M (N_{sy} - N_{by}) \text{ or } a_3 = (-e_M)(N_{sy} - N_{by}) \tag{7}$$

wherein $e_M$ is the vector of the measuring direction, $\widetilde{S}_R$ is the cross product of the vector of the reference direction with the vector of the measuring direction, $N_{sy}$ is the component of the measured direction of the sun ($S_b$) in the measuring direction, $N_{by}$ is a preset basic value of this component, and O is the optical axis of a sensor determining the direction of the sun.

7. Arrangement for aligning a space vehicle with respect to a reference object, including:
a measuring direction monitoring device for obtaining a measuring direction by determining the angular orientation direction of the space vehicle with respect to the reference object,
actuators for subsequently aligning the space vehicle in such a manner that the measuring direction corresponds to a reference direction on the space vehicle, and
an actuator control system for controlling the actuators in response to signals derived from the measuring direction monitoring device to cause control torques on the space vehicle,
wherein said arrangement is operable to determine the orientation of the space vehicle and reference object only with respect to a single measuring direction along a main axis of a direction sensor of the monitoring device,
and wherein said arrangement is operable to carry out the following steps if the measuring direction does not correspond to the reference direction on the space vehicle:
(a) rotation of the space vehicle around the reference direction on the space vehicle,
(b) controlling a fault component of the direction of the reference object situated in the measuring direction by locking on a first control torque perpendicularly with respect to the measuring direction and perpendicularly with respect to the reference direction on the space vehicle, and
(c) controlling the unmeasurable component of the direction of the reference object situated perpendicularly with respect to the measuring direction by locking on a second control torque perpendicularly with respect to the reference direction and perpendicularly with respect to the first steering moment.

8. Arrangement according to claim 7, wherein the reference object is the sun and the space vehicle is a geostationary satellite.

9. Arrangement according to claim 8, wherein a sun sensor is provided, the output signal of which, after a zero point correction, is supplied to a delimiter,
wherein, in a first branch, a first multiplier is provided for calculating the rotating direction of a control vector ($a_2$) from the measuring direction ($e_M$) and a reference direction (O or SR),
wherein, in a second branch, another multiplier is provided for calculating the rotating direction of another control vector also from the measuring direction ($e_M$) and a reference direction ($S_R$ or O), wherein the rotating direction vectors are each multiplied with the output signal of the limiter and are subsequently added to one another, wherein the sum signal is supplied to a multiplier for multiplication with a control parameter ($K_p$), wherein, in a third branch, a multiplier is provided for calculating a rotational rate vector ($w_b$) of the space vehicle around three axes on the space vehicle from a reference direction ($S_R$) in a constant (c), wherein three multipliers are provided in which the sum signal combined from the two control vectors ($a_2$, $a_3$), the rotational rate vector ($w_b$) and the rotational rate (w) of the space vehicle are multiplied with control parameters ($K_p$, $K_D$), and wherein the output quantities of these multipliers are supplied to an adding device, the output signal of which is the control signal.

* * * * *